Aug. 27, 1935.  J. BYSTRICKY  2,012,923
LUBRICATING APPARATUS
Filed June 27, 1932  2 Sheets-Sheet 1
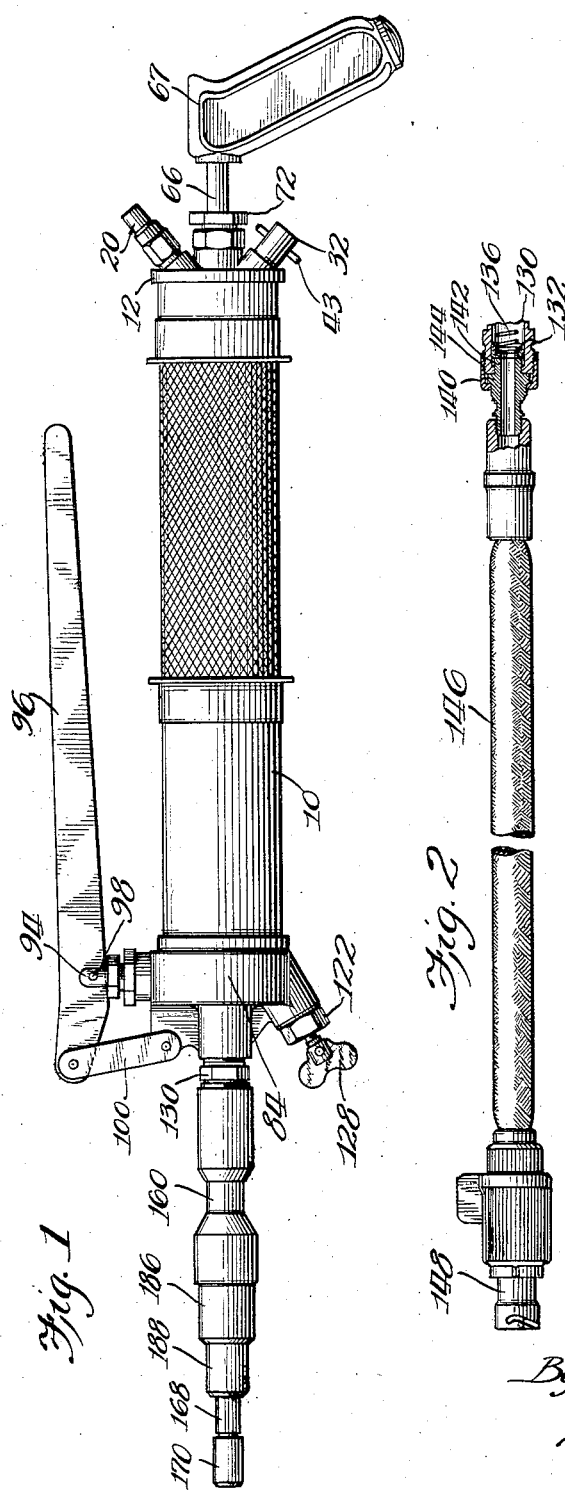
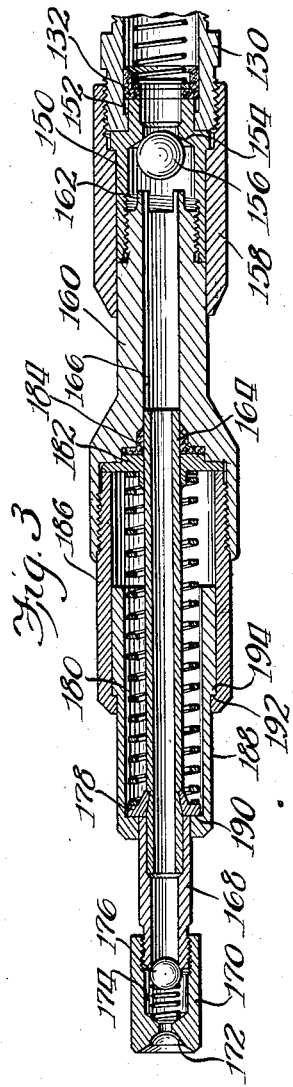
Inventor:
Joseph Bystricky
By Williams, Bradbury,
McCaleb & Hinkle
Attys.

Patented Aug. 27, 1935

2,012,923

UNITED STATES PATENT OFFICE 2,012,923

LUBRICATING APPARATUS

Joseph Bystricky, Chicago, Ill., assignor, by mesne assignments, to Stewart-Warner Corporation, Chicago, Ill., a corporation of Virginia Application June 27, 1932, Serial No. 619,361

4 Claims. (Cl. 221—47.4)

My invention relates generally to lubricating apparatus, and more particularly to improvements in portable manually operated high pressure grease guns.

It is an object of my invention to provide an improved grease gun which may be used to eject practically any grade of greases under extremely high pressure. A grease of very stringy and sticky consistency has come into quite general use, this grease being extremely difficult to handle in lubricant compressors. The compressor of my invention, however, is capable of ejecting this type of grease, as well as other kinds, with great facility.

A further object of my invention is to provide an improved pneumatic means for priming the high pressure cylinder of a grease gun.

A further object is to provide an improved blow-off and vent valve for use in pneumatically operated lubricant compressors.

A further object is to provide a grease gun with a high pressure ejecting means having improved means for by-passing said means so that other ejecting means may be utilized in place thereof.

A further object is to provide an improved means for latching the follower or low pressure piston in retracted position.

A further object is to provide an improved high pressure grease gun of simplified construction which may be economically manufactured and which will be efficient and effective in operation.

A further object is to provide an improved telescopic discharge nozzle for high pressure grease guns.

Other objects will appear from the following description, reference being had to the accompanying drawings, in which Figure 1 is a side elevation of my improved grease gun;

Figure 2 is a plan view of a discharge conduit and coupler usable with the grease gun shown in Figure 1, a portion thereof being shown in section to illustrate the means for coupling the conduit to the grease gun;

Figure 3 is a central longitudinal section of my improved telescopic discharge nozzle.

Figure 4:
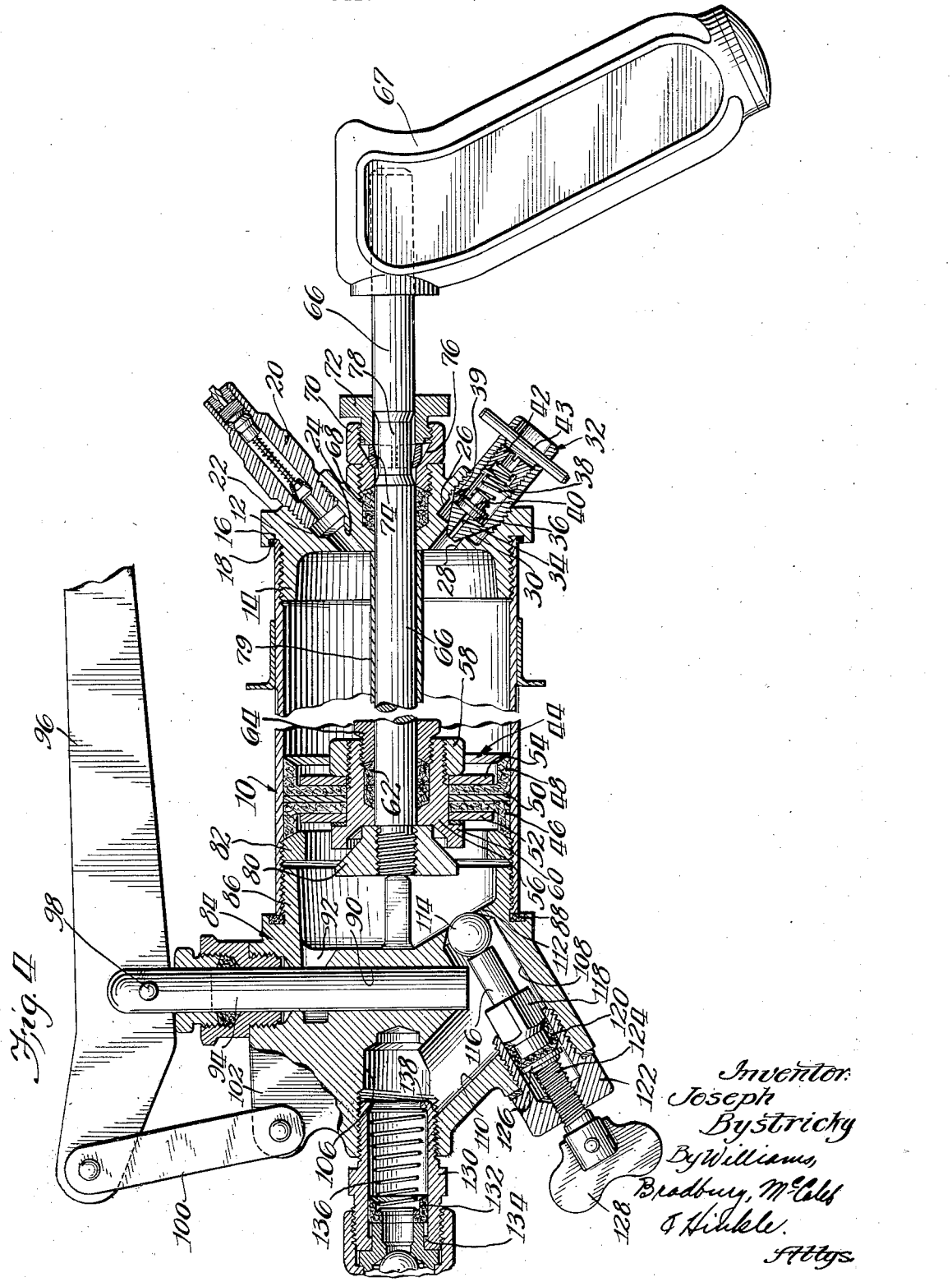
Figure 4 is a central vertical sectional view of the grease gun shown in Figure 1, showing only the connecting portion of the discharge nozzle.

Referring to Figs. 1 and 4, the grease gun of my invention comprises a cylindrical barrel 10. One end of the barrel is closed by a cap 12 having a flange 14 threaded within the barrel, the cap 12 being provided with an annular groove 16 to receive the extremity of the barrel, suitable sealing means 18 being provided to prevent leakage of air from the barrel. An air valve fitting 20, which may be of any desired conventional construction such as commonly used on pneumatic tires, is threaded in a bore 22 formed in the cap 12 and communicates with the interior of the barrel 10 through a passageway 24.

The cap is also provided with a threaded bore 26 which communicates with the interior of the barrel through a passageway 28, the end of the passageway 28 being normally closed by the conical end portion 30 of a vent valve member 32. The member 32 is provided with a vent opening 39. The conical portion has a central air duct 34 which is normally closed by a valve 36. The latter is held over the end of the duct 34 by a spring 38, one end of which abuts against a backing member 40 for the valve 36, and the other end of which abuts against a sleeve 42 threaded in the member 32. The member 42 may be adjusted so as to vary the degree of compression of the spring 38. The valve thus serves as a blow-off or safety valve to prevent excessive air pressure within the barrel 10. The member 32 may be conveniently rotated by grasping the projecting ends of a pin 43 which extends diametrically through the member 32 and is frictionally retained in place.

A piston, designated generally as 44, comprises a pair of oppositely facing cup leathers 46, 48, a backing plate 50 and a pair of face plates 52 and 54, all of which are mounted upon a sleeve 56, being held thereon by a nut 58 which is threaded over the end of the sleeve and holds the parts in assembled relation against a flange 60 formed at the other end of the sleeve. The sleeve 56 is recessed to receive a packing 62, which is held in position by a packing gland 64 threaded in the end of the sleeve. The sleeve 56 surrounds a piston rod 66 which extends through the cap 12 and which carries a pistol grip handle 67 at its outer extremity. Leakage of air to the atmosphere past the piston rod 66 is prevented by a suitable packing 68 held in place by a packing gland 70. The outer extremity of the packing gland 70 is threaded to receive a sleeve nut 72 which, upon being threaded inwardly, is adapted to radially compress a split locking ring 74 by pressing the latter against a conically tapered surface 76 formed within the packing gland 70. The locking ring serves as a means for holding the piston rod 66 in its innermost position, and for this reason the rod is provided with a portion 78 of reduced diameter. When, as shown in Figure 4, the split resilient ring 74 is radially compressed, it lies within the annular space around the reduced diameter portion 78 and thus prevents the piston rod 66 from appreciable longitudinal movement. A short tube 79 surrounding the piston rod 66 limits rearward movement of the piston.

The end of the piston rod 66 is threaded to receive a stop nut 80, which is adapted to engage with the sleeve 56 when the piston 44 is retracted by pulling outwardly on the piston rod 66. The head end of the barrel 10 has a ring 82 threaded therein serving as a retainer for the piston 44. A head casting 84 of the high pressure ejecting means has a flange 86 threaded into the head end of the barrel 10, a suitable gasket 88 being provided to make a tight seal at this point.

The head casting 84 is provided with a high pressure cylinder 90 which communicates with the interior of the barrel 10 through an inlet port 92. A plunger 94 is adapted to be reciprocated in the cylinder 90 by means of a manually operable lever 96. The outer end of the plunger 94 is forked and pivotally connected with the lever 96 by a pin 98. A pair of links 100 (only one shown) are pivotally connected to the extremity of the lever 96 and pivotally connected to a lug 102 formed integrally with the head casting 84.

The head casting 84 has a discharge outlet passageway 106, which, through a duct 110, communicates with the lower end of the cylinder 90 and with a valve chamber 108.

An apertured valve seat 112, formed at the end of the valve chamber 108, is normally closed by a ball valve 114 which is held against the seat by the cylindrical end projection 116 of a valve actuator 118. A cup leather 120 encompasses a reduced end portion of the actuator 118 and is guided in the cylindrical bore of a bushing 122 which is threaded in a suitable boss formed on the head casting 84. A stem 124 is threaded in the bushing 122 and is adapted to press the valve actuator 118 forwardly against the ball valve 114 through a bearing plate 126, the stem being provided with a wing handle 128.

A bushing 130 is threaded in the discharge port 106 and has a cylindrical bore in which a cup leather sealing member 132 is mounted for reciprocation. The cup leather is normally held in its leftmost (Fig. 4) position in engagement with an annular shoulder 134 by a compression coil spring 136 retained within the bushing 130 by a flange 138 spun inwardly at the inner extremity thereof.

The grease gun above described may be used in conjunction with the discharge conduit shown in Fig. 2, or in conjunction with the push type nozzle and high pressure compressing means shown in Fig. 3, depending upon the type of lubricant-receiving fittings with which the compressor is to be used. The discharge conduit shown in Fig. 2 is provided with a union fitting 140 having a cylindrical projection 142 engageable with the face of the cup leather sealing member 132, the fitting being held in place by a sleeve nut 144 threaded over the end of the bushing 130. The fitting 140 is secured to a flexible hose 146 by any suitable connection means and a coupler 148 is secured to the free end of the hose 146. The coupler may be of any desired construction suitable for making a lubricant-tight connection with a lubricant-receiving fitting and is illustrated as of the type shown in A. V. Gullborg Patent No. 1,307,734, granted June 24, 1919, for use in cooperation with so-called "pin fittings", likewise disclosed in said patent.

When it is desired to use the lubricant compressor with fittings of the so-called "push type fittings", as illustrated, for example, in the patent to O. Zerk, No. 1,475,980, granted December 4, 1923, the nozzle construction shown in Fig. 3 may be substituted for the discharge conduit shown in Fig. 2. The nozzle comprises a union element 150 having a cylindrical projection 152 adapted to be projected into the bushing 130, and having its end face engaged by the sealing cup leather 132.

The element 150 is provided with a valve seat 154 which is adapted to be closed by a ball valve 156. The element 150 is tightly coupled to the bushing 130 by a threaded sleeve 158. A high pressure cylinder 160 is threaded into the element 150 and has terminal projections 162 which prevent the end of the cylinder from being closed by the ball valve 156. A hollow plunger 164 is reciprocable in the bore 166 of the cylinder 160. The plunger is tightly connected to a pipe extension 168, which carries a nozzle tip 170. The nozzle tip has the usual recess 172 for making contact with the lubricant-receiving fitting, and is provided with a valve chamber 174 for retaining a spring-pressed ball check valve 176 which normally closes the end of the pipe extension 168. The hollow plunger 164 has a spring abutment 178 rigidly secured thereto for a compression coil spring 180, the other end of which seats against a guide 182. The guide 182 presses against a sealing hat washer 184 and is held in place by a retaining sleeve 186, which is threaded into the enlarged end of the cylinder 160. A telescoping sleeve 188 is mounted for sliding movement into the retaining sleeve 186 and is provided with an annular inwardly projecting stop shoulder 190, which is engageable by the abutment 178 to limit outward movement of the hollow plunger 164. Cooperating stop shoulders 192 and 194 are also provided on the retaining sleeve 186 and telescoping sleeve 188, respectively, to limit outward movement of the former relative to the latter.

The grease gun may easily be filled by unscrewing the barrel 10 from the head casting 84 and plunging the end of the barrel into a supply of grease and having released the latching ring 74, retracting the piston 44 by pulling outwardly on the handle 67.

During this operation, the vent valve 30 will be open so as to permit escape of air from the upper end of the barrel 10. The piston will be withdrawn until the face of the bushing 64 contacts with the end of the tube 79. The tube is sufficiently long that an adequate air space will be maintained behind the piston 44, with the result that if air is forced into this space at the pressure customarily available, the air will expand and maintain pressure upon the piston throughout its discharge stroke sufficiently rapidly to prime the high pressure cylinder.

Having filled the barrel 10, it is again screwed on the head casting 84. The vent valve 30 is then closed and air is forced into the space behind the piston 44 within the barrel 10 from any suitable source by making connection with the check-valved nipple 20. Excesses of pressure within the barrel 10 are prevented by the blow-off valve 36, which may be adjusted to vent the barrel to the atmosphere at any desired predetermined pressure.

Assuming that it is desired to lubricate bearings equipped with the so-called "pin fittings", the hose shown in Fig. 2 is connected to the nipple or bushing 130, the extremity 142 of the union fitting 140 engaging the cup leather sealing washer 132, thereby effecting a lubricant-tight seal. When the compressor is to be used for supplying lubricant to pin-fitting equipped bearings, the check valve 114 is firmly pressed against its seat in the position shown in Fig. 4 by turning the wing handle 123 of the valve stem 124. The grease gun will then be in condition for operation and the coupling 148 may be connected to a pin fitting through which lubricant is to be supplied to the bearing. Thereafter, the compressor is operated in the usual manner by reciprocating the plunger 94 by means of the lever 96. At the end of its return stroke, the end of the plunger 94 uncovers the port 92, whereupon the compressed air behind the piston 44 will cause the latter rapidly to force grease contained within the barrel 10 into the high pressure cylinder 90 to prime the latter.

When it is desired to use the lubricant compressor for the lubrication of a machine equipped with push type fittings, the telescoping nozzle shown in Fig. 3 is substituted for the flexible hose and coupler assembly. A lubricant-tight seal is effected by the engagement of the cup leather sealing washer 132 with the end face of the terminal portion 152 of the union fitting 150. The valve 114 is opened by unscrewing the valve stem 124, whereupon lubricant may flow directly under the pressure of the compressed air within the barrel 10 past the check valve 156 into the high pressure cylinder 166. The pressure will, however, ordinarily not be sufficiently high to cause flow through the hollow plunger 164 and past the spring-pressed check valve 176. If there is any tendency of the lubricant to exude past the check valve 176, the pressure in the barrel 10 may be partially relieved by opening the vent valve 30 for an instant. Lubricant is discharged from the cylinder 166 by pressing the nozzle 170 against the lubricant receiving fitting and pushing the grease gun bodily toward said fitting. Such movement of the grease gun will cause a movement of the hollow plunger 164 into the cylinder 166, thereby ejecting lubricant under high pressure past the check valve 176 into the bearing to be lubricated. Upon return movement of the grease gun, the spring 180 will maintain the nozzle 170 in contact with the fitting, in readiness for the next discharge stroke. The telescoping sleeves 188, 186, protect the spring against injury. The provision of these telescoping sleeves makes it possible to shorten the length of the nozzle assembly by an amount equivalent to approximately half the stroke of the plunger 164. During the discharge stroke, the check valve 156 is of course forced tightly against its seat by the increased lubricant pressure and, of course, is forced away from its seat to permit flow of lubricant during the return stroke.

During the operation of the grease gun, the piston rod 66 is preferably locked in its innermost position by tightening the bushing 72 and thereby forcing the split ring 74 tightly against the piston rod 66 at its portion 78 of reduced diameter. The handle 67 will thus be rigidly connected to the grease gun proper and may conveniently be used during the operation of the grease gun, especially when the compressor is being used for the lubrication of machines equipped with the push type lubricant-receiving fittings.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a portable high pressure lubricant compressor, the combination of a container for lubricant, means for maintaining the lubricant in said container under relatively low pressure, high pressure discharge means connected to said container and supplied with lubricant therefrom, a discharge conduit for receiving lubricant from said last named means, a passageway from said container to said discharge conduit, and a manually operable valve arranged to close said passageway, said valve comprising a ball, a cylinder member, a reciprocable plunger having one end conformed to force said ball against the valve seat, a threaded stem engageable with said plunger, and a cup leather in said cylinder preventing leakage between said plunger and the walls of said cylinder.

2. A discharge nozzle for high pressure lubricating apparatus comprising a cylinder, a tubular piston reciprocable in said cylinder, a spring for withdrawing said piston from said cylinder, and a pair of relatively telescoping sleeves surrounding and enclosing said spring, one of said sleeves being secured to said cylinder and the other of said sleeves being slidable relative to said piston.

3. In a high pressure lubricant compressor, the combination of a source of lubricant under low pressure, a high pressure cylinder having an inlet check valve, a tubular plunger reciprocable in said cylinder, a spring for retracting said plunger from said cylinder, and a pair of relatively telescopic elements surrounding said spring and forming a limit stop for retractive movement of said plunger, one of said sleeves being rigidly secured to said high pressure cylinder and the other of said sleeves being slidably mounted upon said tubular plunger.

4. In a high pressure lubricant compressor, the combination of a source of lubricant under low pressure, a high pressure cylinder having an inlet check valve, a tubular plunger having an abutment and reciprocable in said cylinder, a spring engaging said abutment and acting thereupon to withdraw said plunger from said cylinder, and a pair of relatively telescopic sleeves, one of said sleeves being fixed relative to said cylinder and the other being slidable relative to said plunger and having a shoulder engageable with said abutment.

JOSEPH BYSTRICKY.